United States Patent
De Lange et al.

(10) Patent No.: US 6,442,145 B1
(45) Date of Patent: Aug. 27, 2002

(54) ROBUST METHOD AND APPARATUS ENABLING MULTI-MODE WIRELESS OPTICAL COMMUNICATION

(75) Inventors: Martin De Lange, Zurich; Fritz R. Gfeller, Rüschlikon; Walter Hirt, Wettswil, all of (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/101,104
(22) PCT Filed: Jan. 3, 1996
(86) PCT No.: PCT/IB96/00002
§ 371 (c)(1), (2), (4) Date: Jul. 1, 1998
(87) PCT Pub. No.: WO97/25788
PCT Pub. Date: Jul. 17, 1997

(51) Int. Cl.⁷ .................................................. H04B 7/00
(52) U.S. Cl. ........................................ 370/310; 370/204
(58) Field of Search ........................... 370/310, 204, 370/205, 213, 215, 229, 233, 234, 337, 343, 389, 395.1, 503, 509, 520, 321, 203, 401; 375/239; 399/158

(56) References Cited

U.S. PATENT DOCUMENTS

| | | | |
|---|---|---|---|
| 5,099,364 A | | 3/1992 | Kawabata ............... 386/119 |
| 5,247,380 A | * | 9/1993 | Lee et al. ............... 359/118 |
| 5,297,144 A | * | 3/1994 | Gilbert et al. ........... 370/346 |
| 5,297,185 A | * | 3/1994 | Best et al. .............. 375/368 |
| 5,559,804 A | * | 9/1996 | Amada et al. ........... 370/347 |
| 5,602,669 A | * | 2/1997 | Chaki ..................... 359/181 |
| 5,684,871 A | * | 11/1997 | Devon et al. ........... 375/239 |
| 5,771,462 A | * | 6/1998 | Olsen ..................... 455/524 |
| 5,818,826 A | * | 10/1998 | Gfeller et al. .......... 370/342 |

FOREIGN PATENT DOCUMENTS

WO  WO9528777  10/1995

* cited by examiner

Primary Examiner—Dang Ton
Assistant Examiner—Brian Nguyen
(74) Attorney, Agent, or Firm—Scott W. Reid

(57) ABSTRACT

Disclosed is an optical communication system enabling communication between several co-existing transmitting and receiving stations. In order to allow communication between the co-existing stations, a robust physical layer header (RPLH; 50) is employed which can be understood by all participating stations. This robust header (50) at least comprises a preamble (52) consisting of frames forming a periodic sequence of pulses, the number of slots per frame and the frame content being known to all participating stations. The preamble (52) serves for relative synchronization and carrier detection of the receiving stations. The robust header (50) further comprises a unique synchronization word (53) used for absolute synchronization of the receiving stations. This synchronization word (53) is followed by a control field (59) of fixed length and known structure. By means of this control field (59) the receiving stations are informed which modulation method will be used for the transmission of data. Under certain circumstances it is also useful to provide other control information in said control field (59) for communication link and network control. Furthermore, information may be exchanged to allow negotiation and/or adaptation of the data rate used for transmission. This allows to optimize the throughput depending on the conditions (quality) on the channel.

42 Claims, 13 Drawing Sheets

| Subsystem name attribute | | Data rate | Modulation | Range | Environment | Application |
|---|---|---|---|---|---|---|
| S1 | Variable-rate (supervisor node = SN) | 64kb/s ... 4Mb/s | 4/16 - PPM | 5 - 10m diffuse | All office | Ad-hoc networking, device-sharing |
| S2 | High-rate | 4 - 10Mb/s | 4 - PPM, Man-chester | 1 - 2m direct LOS | Desktop | CD-ROM, Scanner, File-transfer |
| S3 | Low-rate | 8 - 16kb/s | 4/16 - PPM, FM, PSK | <25m diffuse | All office, shop floors, lobby, factory | Paging, data-collection |
| S4 | Remote control | <1kb/s | various | <15m diffuse | Home | TV, Audio, Video |

*FIG. 1*

DSF = Data/Subsystem Field

FIG. 9

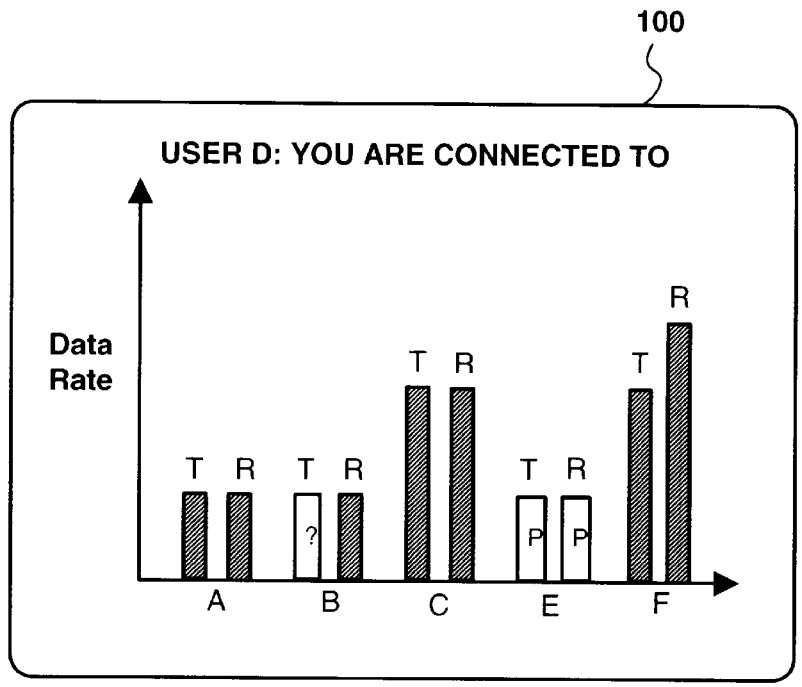
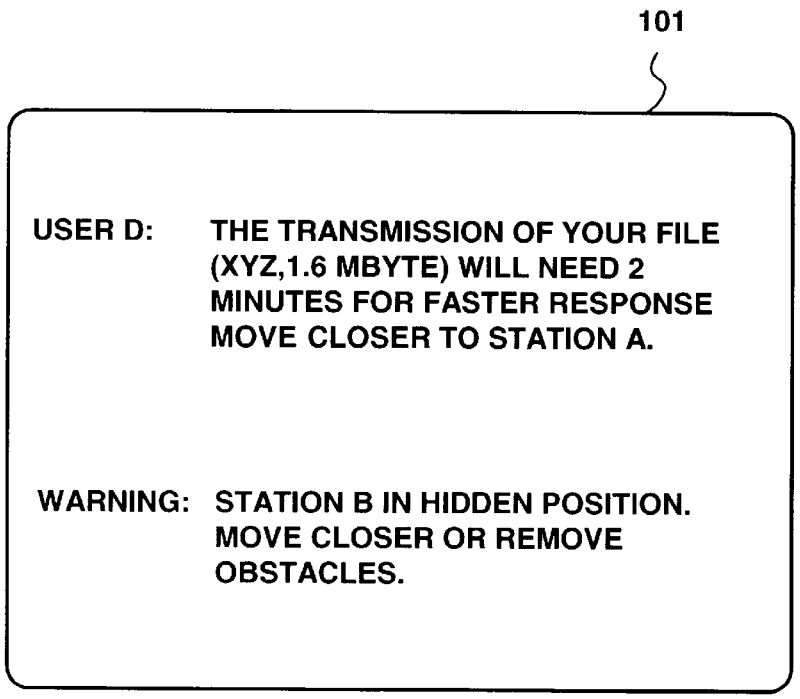
FIG. 10

ROBUST METHOD AND APPARATUS ENABLING MULTI-MODE WIRELESS OPTICAL COMMUNICATION

TECHNICAL FIELD

The present invention relates to multi-mode wireless optical communication systems and the communication and/or coexistence of communication between different kinds of devices, operating in different modes within such communication systems.

BACKGROUND OF THE INVENTION

With the rapidly increasing number of workstations and personal computers (e.g. desktop or handheld ones) in all areas of business administration, fabrication etc., there is also an increasing demand for flexible and simple interconnection of these systems. There is a similar need as far as the hook-up and interconnection of peripheral devices such as keyboards, computer mice, printers, plotters, fax machines, scanners, displays, modems, and so forth, is concerned. The use of electrical interconnects becomes a problem with increasing number of systems communicating with each other, and in many cases in which the location of systems, or the configuration of subsystems, must be changed frequently. It is therefore desirable to gain flexibility by eliminating electrical interconnects for such systems and using wireless communication instead.

The use of optical signals for wireless transfer of digital data between systems and devices has received increased interest during recent years and has lead to applications in commercial products. One example is the optical remote control of electronic consumer devices. Another example is the communication between information systems in an office environment. In an optical communication system digital data to be transferred between a transmitting system and a receiving system are transformed into modulated optical signals which are radiated by a light source —in particular an infrared (IR) light source—of the transmitting system and are received, converted to electrical signals and then into digital data by the receiving system. The optical signals might directly propagate to the optical receiver of the receiving system or they might indirectly reach the receivers after changes of the direction of propagation due to processes like reflections or scattering at surfaces. Today, the former case is realized in portable computers and peripheral devices where the data transfer takes place between an optical transmitter and a receiver which are close together at a distance on the scale of 1–3 m and properly aligned. The latter case is typical for applications in an office environment in which undisturbed direct transmission of optical signals between transmitters and receivers several meters away from each other is impractical or even impossible due to unavoidable perturbations of the direct path. One known approach to achieve a high degree of flexibility is to radiate optical signals form the transmitting system to the ceiling or walls of an office where they are reflected or diffusely scattered. Thus, the radiation is distributed over a certain zone in the surroundings of the transmitter. The distribution of the light signals spreading from the ceiling depends on many details which are characteristic for the particular environment under consideration. However, essential in this context is mainly that the transmission range, i.e. the distance between transmitting system and receiving system, is limited to some final value, hereafter called the transmission range, since the energy flux of the transmitted radiation decreases with increasing distance or propagation and the receiver sensitivity is limited due to a minimum signal-to-noise ratio. Typical known systems, operating at levels of optical power which are limited by the performance of the light sources and safety requirements for light exposure, have demonstrated transmission ranges of several meters for data rates of 1 Mbps.

The latter example illustrates basic features of wireless optical communication and indicates fields of applications where it is favorably applied in contrast to another competitive method of wireless communication, the radio frequency (RF) transmission. Wireless optical communication allows data transmission which is short range, whereas RF transmission is potentially long range. Furthermore, optical wireless communication in an office environment is localized since typical boundaries of an office such as walls and ceilings are not transparent for sight but generally for RF waves. That is why possible interferences between different communication systems are easier to control and a simpler way for achieving data security is possible for a wireless communication system which is based on optical radiation rather than RF transmission. RF transmission is even restricted by communications regulations and licenses whereas optical wireless communication systems are not.

Crucial performance parameters of a wireless optical communication system are the achievable data rate and the distance between the systems exchanging data. In an office environment, it can be necessary to communicate data over distances exceeding the transmission range of a single optical transmitter. However, the transmission range of a single optical transmitter can be extended within the concept of wireless communication, for example by introducing optical repeaters. One example of such an extended system has been proposed in U.S. Pat. No. 4,402,090 entitled "Communication System in which Data are Transferred Between Terminal Stations and Satellite Stations by Infrared Systems". In this patent, a system is described which provides a plurality of satellite stations, i.e. stations usually fixed at the ceiling of a large room. Terminals can optically interact with satellites within their transmission range, and data can be distributed via intersatellite communication thus enabling the distribution of data over distances beyond the transmission range of a single transmitter.

When designing a wireless optical communication system, one has to be aware of unavoidable ambient light, such as daylight or light from lamps, which always reaches the optical detectors, unless the system is restricted for the use in a completely dark environment. The IR energy in ambient light (fluorescent and incandescent lamps, sun light) can lead to dominant noise in the optical receiver. Thus, ambient light influences the signal-to-noise ratio of the receiver and, therefore, affects the transmission range. Further details on the effect of ambient light are outlined in the pending PCT patent applications PCT/EP 94/01196, published on Oct. 26, 1995 (Publication No. WO 95/28777). The appearance of ambient light is mostly statistical and often difficult to control and its intensity can drastically change, as it is apparent for lamps being switched on/off, or sunlight. A further realistic effect which statistically affects the signal-to-noise ratio and thus the transmission range is the occurrence of optical path obstructions influencing the receiver signal. In an office environment, for example, moving users can change the strength of the transmitted signals and the influence of unavoidable ambient light as well.

In present light-based wireless communication systems, first obvious attempts have been made to handle the ambient-light problem. Usually, low frequency ($\leq$500 KHz)

AC signals, which can be attributed to common room illumination, are suppressed with electrical filters after the conversion of light to electrical signals. Optical filters are used to restrict the spectrum of undesired ambient light. However, a significant portion of daylight is spectrally in the same range as the optical radiation of the light sources appropriate for wireless communication systems.

As described in the above mentioned PCT patent applications PCT/EP 94/01196, and in another PCT application PCT/EP 94/00577, published on Aug. 31, 1995 (Publication No. WO 95/23461), it is possible to provide an infrared wireless communication system which efficiently copes with basic problems, such as incident ambient light, for example, of commercially available systems. In PCT/EP 94/01196 a scheme is provided which allows the dynamic optimization of wireless optical communication systems exposed to changing levels of ambient light.

Different schemes for wireless optical communication have been developed and pushed by the active players in this particular field. This led to various optical communication methods which are not compatible. It is, for example, usually not possible to interconnect a computer of a first manufacturer with the printer of a second manufacturer by means of a wireless optical channel, because in most cases they operate in a different mode and the transmitter/receiver hardware is not compatible.

Part of the incompatibility is caused by independent and uncorrelated development efforts at the respective companies. Furthermore, there are different applications that due to their nature call for different transmission schemes (modes) to achieve adequate data rates and distance coverage. Typical examples are: directed high-rate desktop links for computers and peripheral devices, fixed- or variable data rate locate area networks (LAN) using diffuse radiation, remote control systems, low-rate paging functions, and access links to wire-based systems and to wireless radio frequency (RF) systems, such as cordless phones, for example. It is obvious that the characteristics of these kinds of systems are dictated by the application itself.

This means that certain different optical communication schemes will always have to co-exist, i.e., that one has to cope with multi-mode systems. However, it is to be expected that the differences caused by independent and uncorrelated development efforts will disappear with time, or that at least a standard will be defined such that most of the systems can communicate with each other. An example of such a standard is the existing IrDA standard. Work is going on to extend this standard. Details are given in "Ease File Transfer With IrDA-Protocol Wireless Infrared", Bill Travis, EDN, The Design Magazine of the Electronics Industry, Jul. 1995, pp. 17–22. In this article also the modulation method defined by the IrDA standard is described.

A solution which accommodates the different requirements and needs of current and future light-based communication systems and ensures their coexistence and/or compatibility—within a common operating environment (e.g. within a large area office)—is presently not available.

It is thus an object of this invention to provide a wireless optical communication system which enables multi-mode operation.

It is another object of this invention to provide a method and apparatus for wireless multi-mode optical communication systems.

It is a further object of the present invention to solve typical problems of current optical communication system, namely channel quality estimation frame/symbol synchronization and so forth.

It is another object of the present invention to provide a method and apparatus for wireless multi-mode optical communication systems which works even under extremely bad channel conditions.

SUMMARY OF THE INVENTION

The invention as claimed is intended to meet these objectives. It provides a method and apparatus enabling wireless optical communication between a transmitting station and a receiving station using a novel and inventive robust physical layer header (RPLH). According to the present invention 1. said transmitting station provides a preamble comprising frames forming a periodic sequence of pulses, i.e., a sequence of pulses with defined period, the number of slots (L) per frame and the frame content as such being known to said receiving station,
2. said transmitting station optically transmits said sequence of pulses,
3. said receiving station performs carrier detection based on said sequence of pulses received,
4. said receiving station determines said period of the sequence of pulses to obtain relative synchronization,
5. said receiving station adjusts its clock to the phase of the slots of the received sequence of pulses, and clocks said incoming sequence of pulses through a shift register,
6. said transmitting station transmits a unique synchronization work which is aligned to the period of said preamble.
7. said receiving station correlates said sequence of pulses in said shift register with said unique synchronization word known to it in order to achieve absolute synchronization with said transmitting station upon recognition of said synchronization word, It is to be noted that the sequence of the above steps is not mandatory. Some of the steps can be also carried out in parallel.

Depending on the particular implementation, it is advantageous if the transmitting station further indicates in said control field the length of the appended data/subsystem field such that a receiving station can extract said information to determine the time duration for muting its own transmitter to avoid signal collision with the ongoing transmission (virtual carrier sense). Under certain circumstances it is also useful to provide other control information in said control field for communication link and network control. Furthermore, information may be exchanged to allow negotiation and/or adaptation of the data rate used for transmission. This allows to optimize the throughput depending on the conditions (quality) on the channel. It is also of advantage to provide priority-access information which allows several co-existing pico-cells within one and the same communication cell.

Further advantages of the present invention and additional examples of information which may be exchanged using the inventive robust physical layer header follow in the detailed description.

The present invention can either be used for communication within a single-mode system, i.e., for communication between stations supporting the same modulation method, or for communication in a multi-mode system. To ensure that multi-mode communication is possible, the respective hardware according to the present invention has to be provide and any communication has to be initiated according to the above steps.

DESCRIPTION OF THE DRAWINGS

The invention is described in detail below with reference to the following drawings:

FIG. 1 shows a table of different, co-existing IR subsystems (S1–S4) and a selection of typical applications.

FIG. 9 shows an exemplary set of rate connectivity tables, according to the present invention.

FIG. 10 shows user network information derived from the rate connectivity tables of FIG. 9.

GENERAL DESCRIPTION

Figure 2:
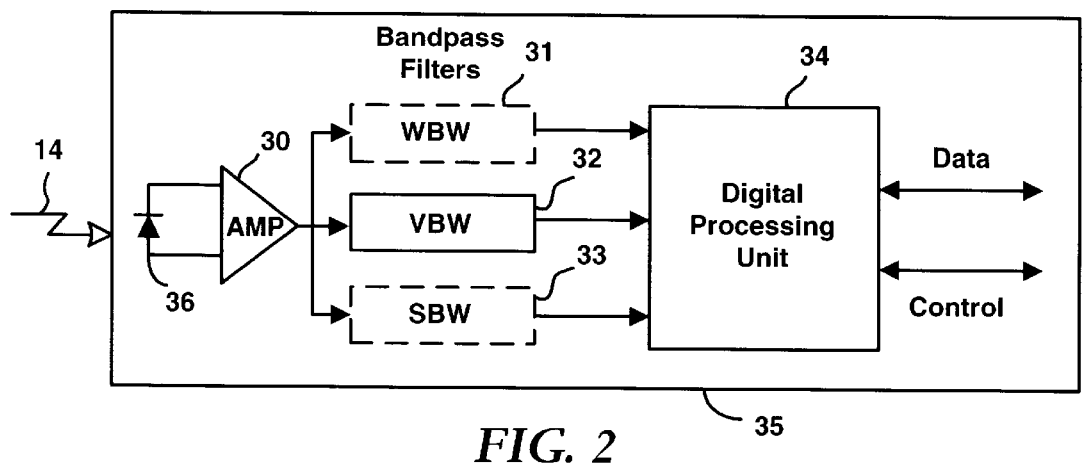
FIG. 2 shows an exemplary receiver of a multi-mode receiving station, according to the present invention, for operation within subsystems S1, S2, and S3.

In general, a system for wireless optical communication comprises at least one station serving as transmitter and a second one serving as receiver. The transmitter comprises a light source, e.g. a light emitting diode (LED) or a laser diode, and the receiver comprises a photodiode. The word 'station' is hereinafter used as a synonym for all kinds of computers, terminals, repeaters, peripheral devices etc., which might communicate with each other. The present invention can also be used for communication within a single-mode communication system, however, it is to be noted that the present invention is particularly well suited for communication in multi-mode systems.

Normally, infrared (IR) light is used for wireless optical communication and the term IR communication is used from time to time in the following, although the invention presented is not restricted to a specific range of the light spectrum.

1) The Inventive Robust Header:

Proposed is hereinafter an inventive header (described in more detail later) which is robust in the sense that it can be recognized and decoded by all receivers located within the same communication cell (e.g. office space) even under conditions when normal communication is not longer possible. Furthermore, the inventive robust header enables communication between different stations co-existing in one and the same communication cell, i.e. communication between stations operating in different modes is enabled, coordinated and supported. The inventive robust header comprises a preamble for timing acquisition, carrier detection, and relative synchronization in the receiving station. It further comprises a unique synchronization sequence to ensure absolute synchronization of transmitter and receiver upon recognition of the synchronization sequence in the receiver. Furthermore, it comprises a control field of fixed length transmitted following the synchronization word. This control field is employed to provide the receiving station with information on supported and/or expected user data rates, data block size, modulation method, and other relevant (sub)system information. In particular, it may also comprise information used to identify the recipient(s) (list of addressees) of the data or information to follow after the robust header.

2) Compatibility/Coexistence of Different Transmission Schemes:

Today, in a multi-mode system the signals transmitted by a transceiver of a transmitting station in a certain mode (e.g. subsystem S1, see FIG. 1) cannot be received or understood by the receivers of any receiving unit in another mode (e.g. subsystem S2) and vice versa.

In the following, the novel robust header, also referred to as robust physical layer header (RPLH), which is designed to overcome the incompatibility of co-existing systems, is further elaborated. Furthermore, the RPLH structure, the methods devised for its use, corresponding transmitters and receivers, and a resulting multi-mode wireless optical communication system are described.

It is important that every station participating in the communication within a communication cell transmits a RPLH if a data- or control packet is to be transmitted. Each station within this cell belongs to a set of stations forming a subsystem (Sx), according to a specific application, as illustrated in the table given in FIG. 1. If a station is equipped to participate in more than one type of subsystem communication, then it is a member of all corresponding subsystems. An example of a multi-mode receiver 35, according to the present invention, of a station supporting the subsystems S1, S2 and S3 is schematically illustrated in FIG. 2. It comprises an amplifier 30 and a photodiode 36 forming part of an analog frontend and three bandpass filters 31–33, for example, for filtering the respective signals received via the optical communication channel 14. The filter 31 (WBW) is employed to extract signals used for subsystem S2 communication, filter 32 (VBW) is used for subsystem S1 communication, and filter 33 (SBW) for subsystem S3. The output side of these filters 31–33 may be connected to a digital processing unit 34.

Figure 3:
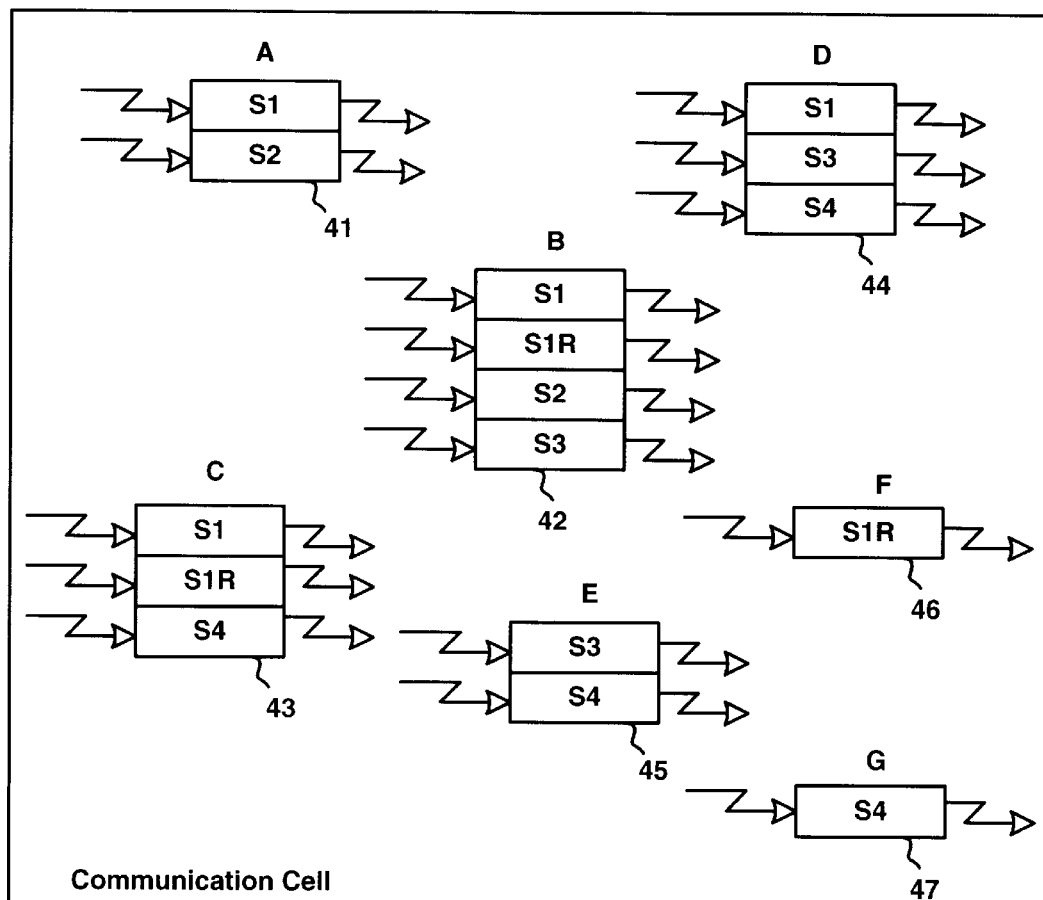
FIG. 3 is an exemplary schematic presentation of the multi-mode stations communicating within a communication cell, according to the present invention (Sx=subsystem, SxR=repeater for subsystem Sx).

Station 41 (A) in FIG. 3, belongs to the subsystems S1 and S2, for example, where S1 consists of the stations 41, 42, 43, 44, 46 (A, B, C, D and F), and S2 consists of the stations 41 and 42 (A and B). A station can also provide repeater functionality for some subsystems. Station 46 (F) in FIG. 3, for example, provides only repeater function for S1, which is indicated by S1R, and station 42 (B) —besides being able to operate within S1, S2 and S3 as a terminal—provides also a repeater function for S1 (S1R). The size of a communication cell 40 is determined by the maximum achievable transmission distance of the most robust of the participating subsystems. Usually, this is the subsystem operating with the lowest data rate, for example, the subsystem S4 providing pager functions.

Figure 4:
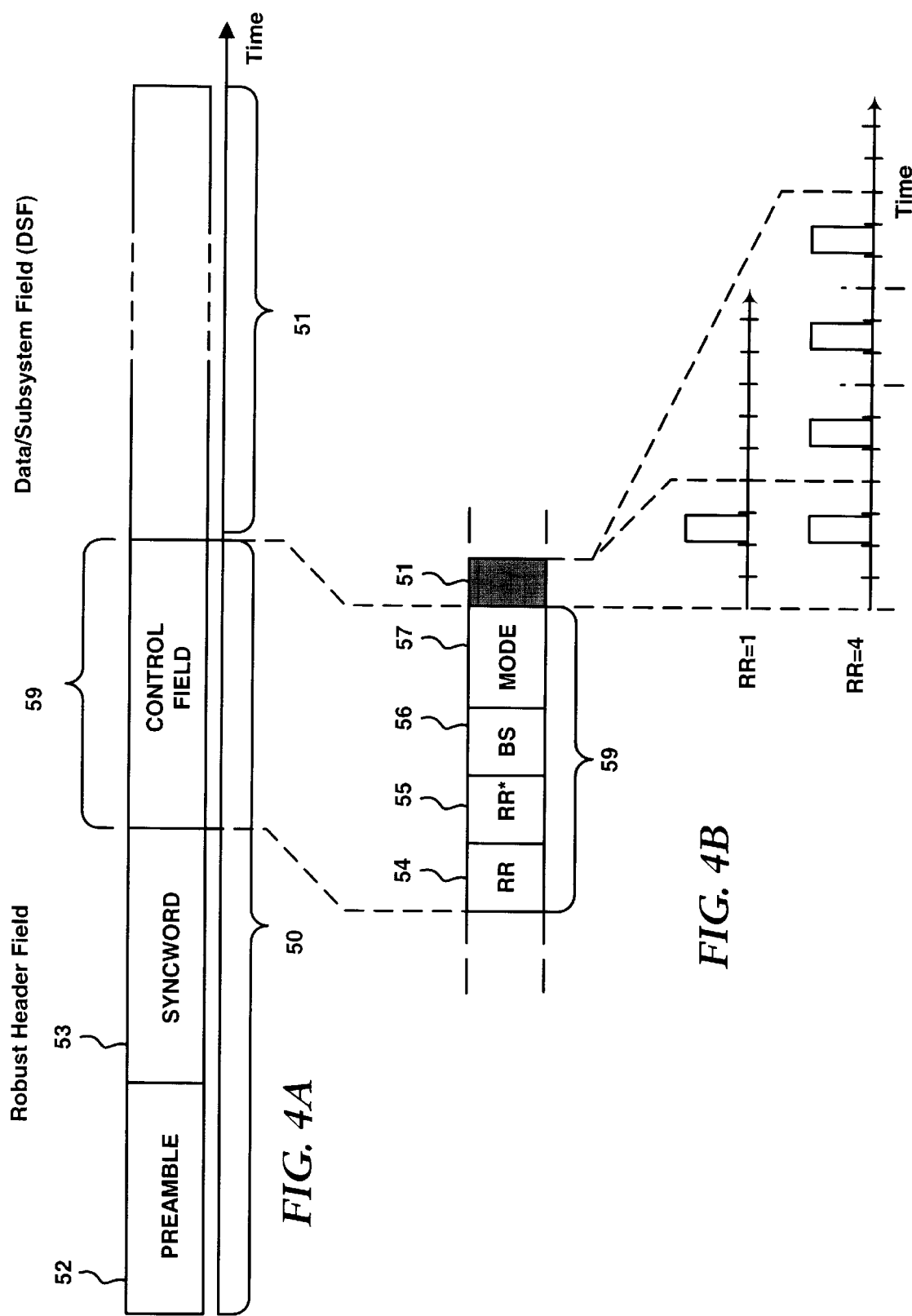
FIG. 4A shows a packet structure with robust physical layer header, according to the present invention.
FIG. 4B shows an exemplary control field of the robust physical layer header and exemplary modulation method in the data/subsystem field (4-PPM in an S1 system), according to the present invention.

The inventive robust header (RPLH) 50 is shown in FIG. 4A. The RPLH 50 allows for a so-called virtual carrier sense (VCS) mechanism based on a channel reservation time scheme. The inventive header 50 at least comprises a preamble field 52 and a synchronization field 53 carrying a preamble and synchronization word, respectively. Furthermore, it comprises a control field 59 of predefined length. This control field 59 may include information supporting adaptive (variable) data rate systems, as described in the pending PCT patent application PCT/EP 94/01196, published on Oct. 26, 1995. Further details of the robust header's fields will be given later.

The network of participating RPLH-based stations (multi-mode terminals and repeaters) is controlled by the stations included in the subsystem with the highest networking capabilities. This set of stations is called the supervisory network (SN). In FIG. 3, the SN is formed by stations 41, 42, 43, 44 and 46 (A, B, C, D and F), i.e. a variable data rate network is used as the SN in the present example. Every station within a RPLH-based communication cell which shall participate in the wireless optical communication must at least be equipped with a receiver frontend capable to receive and understand the RPLH in the modulation scheme used by the stations forming the SN.

The RPLH transmission, according to the present invention, is basically performed in two phases.

Phase 1: Every station within the RPLH range (communication cell 40) has its frontend activated for reception of the header. A station wishing to transmit data waits until the SN channel is in idle state, then it sends the RPLH preferably including the information for VCS and mode. The other stations within said communication cell are listening to this message and process the transmitted information. If a modulation method is indicated in said robust header's control field 59 which a station is capable to support, it stores the VCS information and remains active during phase two. Otherwise, it may set up its timeout counters based on the received VCS information and go into power-save mode, for example. The VCS information, i.e. the reservation time for the wireless channel, is derived from the data rate, block size, and the mode information indicated by the transmitting station by transmission of the control field 59.

Phase 2: The remaining active receiving stations switch their receiver frontend to the mode indicated in the received control field 59 and determine the received destination address transmitted in said information field 59 to determine if the message is for them. All stations not being addressed go into power-save mode, for example, and wait until the channel reservation time expires. The addressed station(s) may now communicate with the initiating (transmitting) station in its proprietary mode as long as the channel was reserved.

As described above, the present concept does not only allow for reliable carrier sensing in all receivers of a communication cell, including those with the lowest signal-to-noise ratio (SNR) budget, but they are also informed for how long the channel will be occupied by the data block to be transmitted. This principle, known as virtual carrier sensing (VCS) has been adopted and optimized such that it can be used in combination with the present robust header concept.

3) Robust Header for Pulse-Position Modulation (PPM) Systems:

Further details of the robust header are given by means of an example. The RPLH 50 of FIG. 4A must be transmitted in a format complying with the SN's modulation method. The RPLH 50 has to be decodable by every station designed to participate within the RPLH-based communication cell. The robust header should further help mitigate the so-called hidden terminal problem. i.e., a header structure is to be defined which complies with the respective SN's modulation method and which is suited to work even under such hostile conditions where the SN (e.g. SN=S1) itself becomes inoperable for data exchange while some of the subsystems (e.g. low-rate pager functions) remain operational.

Exemplary embodiment of the inventive robust header: For a variable-rate system, PPM is the scheme with the highest efficiency. Therefore, we describe the structure of a RPLH for a PPM-based system, the specific problems involved, and the proposed solutions. Details of a suited control field 59 are illustrated in FIG. 4B. The following description assumes a communication system based on a specific PPM data-symbol format (i.e. 4-PPM symbols where two information bits are carried per symbol), however, with appropriate adjustments the method is equality valid for a system using different data symbol formats (e.g. L-PPM symbols where $\log2(L)$ information bits are carried per symbol).

In this embodiment, the different parts of the robust header field 50, the coding methods, and the number of transmitted symbols are given for a variable data rate system based on the 4-PPM symbol format. The S1 subsystem of FIG. 1 functions as the SN:

1. Preamble 52:

The preamble 52 is employed to obtain relative synchronization of the receiver. To achieve this, the preamble 52, which is a periodic sequence of pulses, is transmitted. The receiving station which knows how many slots each frame comprises, is now able to detected after a certain while the period of said sequence of pulses. Furthermore, the receiving station adjusts its slot clock phase (clock recovery) using a clock recovery circuitry (phase locked loop PLL). It is recommend to use a pulse sequence leading to an as fast as possible slot clock phase adjustment. For this purpose, we propose the pulse sequences 10001000. . . or 10000010. . . , either of which may be used for both 16-PPM and 4-PPM formats. Use of different sequences enables also simple (control) information transmission by means of the preamble alone.

Figure 14:
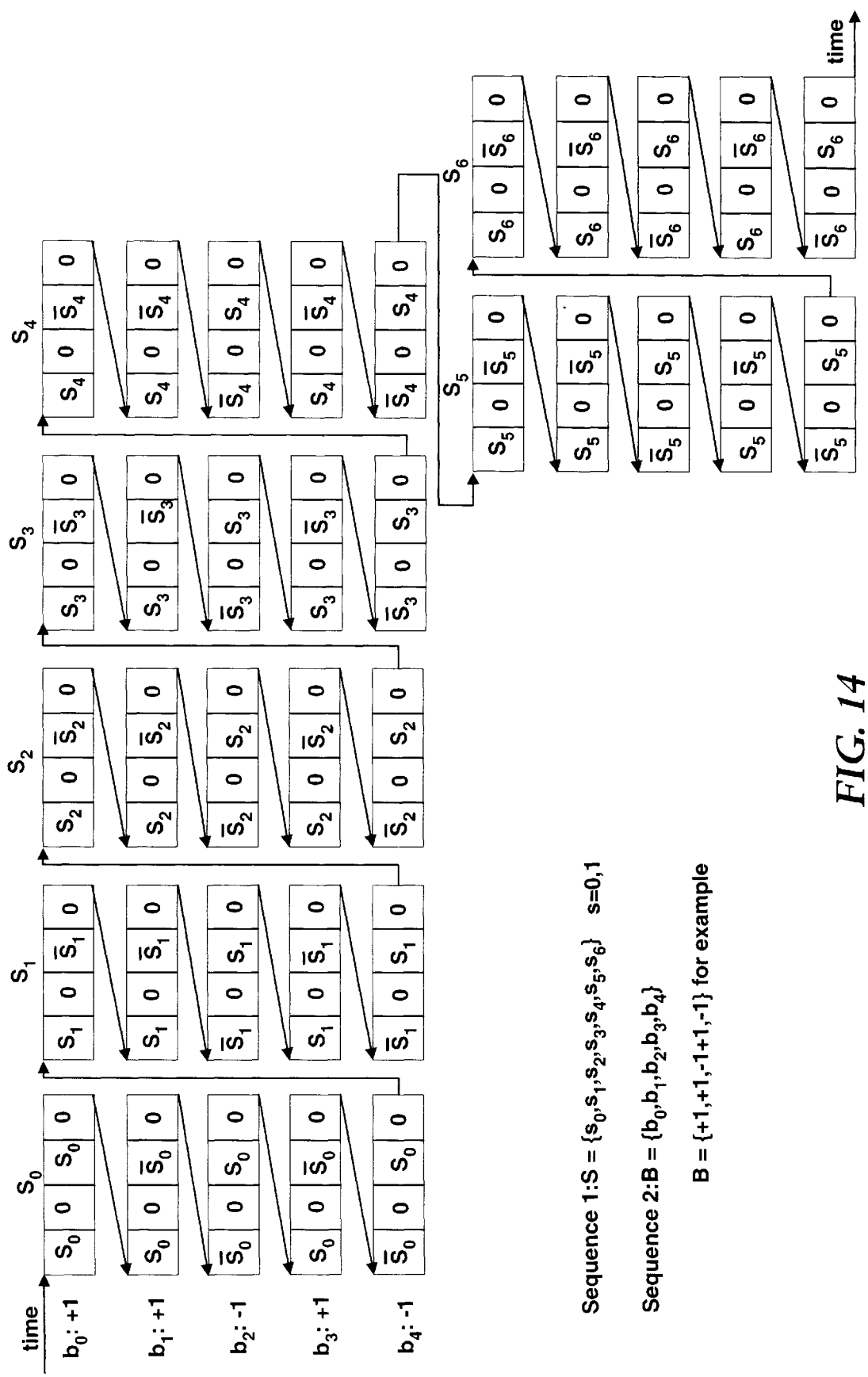
FIG. 14 is a schematic illustration of a synchronization word for 4-PPM, according to the present invention, which is composed using two synchronization words.

2. Syncword 53:

The SYNCWORD 53 may comprise an encoded binary sequence (e.g. a 32-bit sequence) with selective autocorrelation and low cross-correlation with the preamble sequence 52. In the present example, each bit is mapped into four slots to preserve the same duty cycle as the preamble sequence 52: if the bit is a "1", a pulse occurs in the first slot of the 4-PPM symbol; it is a "0", the pulse is located in the third slot. Both slots are searched during reception for impossible bit combinations to improve the sync processing (e.g. correlation) result. Further details are described in connection with FIGS. 6 and 7. Another synchronization word, composed from two separate synchronization words, is illustrated in FIG. 14.

3. RR (Rate Reduction) 54:

The RR field 54 is a word (e.g. four-bit) containing the rate reduction parameter RR of the following data/subsystem field 51 (i.e. the field comprising data) in the case that the subsystem uses repetition coding. The rate reduction parameter indicates how often each pulse-position modulation symbol of the data/subsystem field 51 is repeated. For other subsystems, it may serve as data rate indicator, for example. The RR field 54 is transmitted as two symbols in 4-PPM format with repetition coding.

4. RR* (Recommended Rate Reduction) 55:

The RR* field 55 is a word (e.g. four-bit) containing the recommended rate reduction factor RR* as derived from the estimated channel quality (error rate) during reception of the last data block (for subsystems supporting channel quality estimation). It may be coded in the same manner as RR.

5. BS (Block Size) 56:

The block size subfield 56 contains the number of data units which will be transmitted in the data/subsystem field 51. To reduce overhead, one can define only a limited number of different block sizes; for example, sixteen different block sizes can be distinguished by corresponding mapping of four bits. The block size subfield 56 may be coded in the same manner as the RR symbols.

6. Mode 57:

The mode subfield 57 signals to the receiver(s) with which modulation method the data in the data/subsystem field 51 will be transmitted and whether the data/subsystem field 51 shall be forwarded through a repeater. The number of mode bits is chosen large enough to be able to admit further subsystems. The symbols may be coded in the same manner as the RR symbols.

The information transmitted in the RR field 54 and BS field 56 can be used to determine how long the transmission of the data in the data subsystem field 51 will take. This information is important for the receiving station not being on the list of addressees, because they need to know how long the optical channel will be occupied, i.e. how long they shall remain silent.

To minimize the effects of DC or low frequency components, analog frontends of IR receivers are usually designed for AC coupling operation. A varying symbol duty cycle would therefore require a costly (analog) DC restoration. Furthermore, the transmitter's pulse amplitude and symbol duty cycle must be closed in accordance with the average- and peak power constraints imposed on the IR light source; the latter usually exists in the form of light emitting diodes (LEDs) or laser diodes emitting in the HR spectrum.

The RPLH proposed as an example uses pulse patterns with the same duty cycle as the 4-PPM dat symbols to comply with the power constraints. The same duty cycle may also be implemented in the synchronization field 53 rather than using a different duty cycle as is commonly done. As an additional benefit, DC restoration needs not to be applied when using an RPLH as proposed above. Should the resulting DC shift affect performance to a degree where compensation is deemed to be necessary, one can use the method of threshold control indicated in FIG. 12.

Depending on the transmission scheme used, an algorithm may be employed which determines the channel quality such that the maximum possible data rate can be derived. Since the beginning of the data/subsystem field is exactly known to all active receiving stations of the communication cell(s), these stations can determine the channel quality by analyzing the data received in said data/subsystem field 51. The maximum possible data rate and other information concerning the status within the communication cell may be displayed such that the user is informed at what speed he can transmit data, for example.

According to the present invention it is possible that the robust header as such is used to exchange information between certain stations in a multi-mode communication cell if other communication methods fail. In this case the throughput of information is very limited, however, some information may still be transmitted.

In some cases it may be advantageous to transmit access priority information within the control field 59 which is suited to distinguish information of a first communication cell from information of a second, interfering communication cell. Such a measure enables coexistence of different simultaneously active communication cells (pico cells) within a single cell 40 and each claiming the full channel capacity by ignoring the virtual carrier sense information contained in the RPLH from other pico cells. This is possible since the signal strengths within such a pico cell are sufficiently high to allow channel capturing and thus remain unimpaired by the interference from other distant pico cells. A pico cell may contain two or more mobile or fixed stations and may also contain a station for access to wired networks (LANs).

Figure 5:
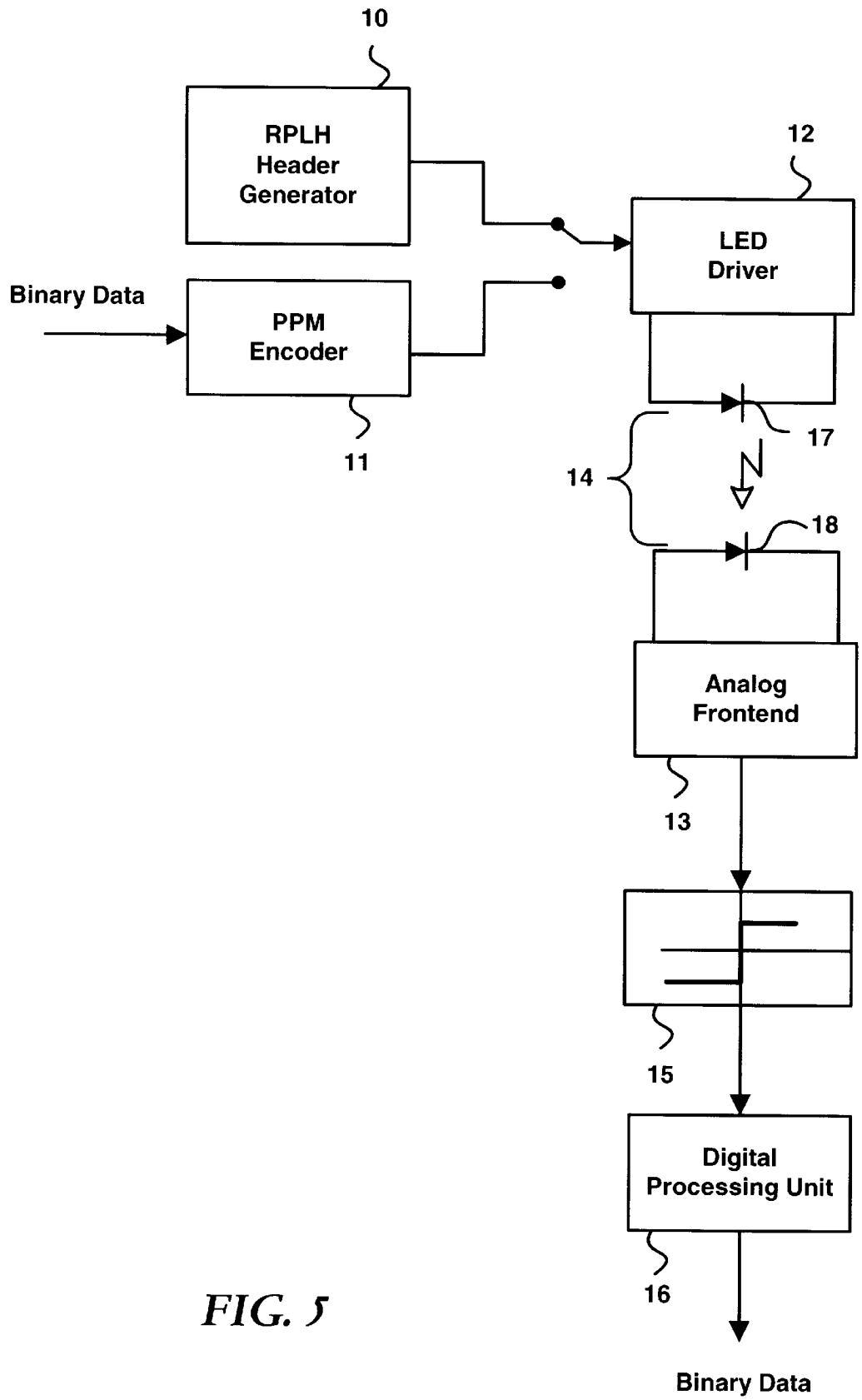
FIG. 5 shows a schematic block diagram of a single-mode optical wireless communication system, according to the present invention.

FIG. 5 shows a first implementation of the present invention. According to this implementation, the RPLH is generated if payload (binary data), or information are to be sent over the optical channel 14. The RPLH is generated by a header generator 10 whereas the binary data are processed and encoded by a suitable encoder 11 used to map the binary data into PPM symbols. In addition, a forward error correction system (not shown) may be employed.

In the first implementation, the encoder is a pulse-position modulation (PPM) encoder 11. A light emitting diode (LED) driver 12 feeds the signals to be transmitted to a LED 17. The LED driver 12 may have a fanout of up to eight devices, yielding a composite optical peak power of up to 2 W, for example. On the other side of the optical channel 14 there is a photodiode 18 (or an array of photodiodes) which receives the signals from LED 17. The output of the photodiode 18 is processed by the receiver's analog frontend 13, for example comprising an amplifier and automatic gain control (AGC) circuitry. Preferably, the analog frontend 13 should be designed to prevent latch-up in the presence of high levels of ambient light, and the AGC circuitry should offer a large dynamic range in excess of 70 dB. Ruling out soft demodulation to avoid the complexity of multi-bit processing, the amplitude controlled analog signal provided by the frontend 13 of the present embodiment is applied to a threshold device 15 (comparator) which generates a binary-valued, continuous-time output signal. The output signal is then processed by means of a digital processing unit 16. The latter at least includes such functions as carrier sensing (carrier detection), slot timing recovery and relative as well as absolute data symbol synchronization by analyzing the fields 52 and 53 of the RPLH. Depending on the information transmitted in the control field 59 of the RPLH, the digital processing unit 16 may also provide for extraction of user data rate and data block size, data decoding and channel quality estimation. An example of the receiver's digital processing unit 16 is given and described in connection with FIG. 6.

Figure 6:
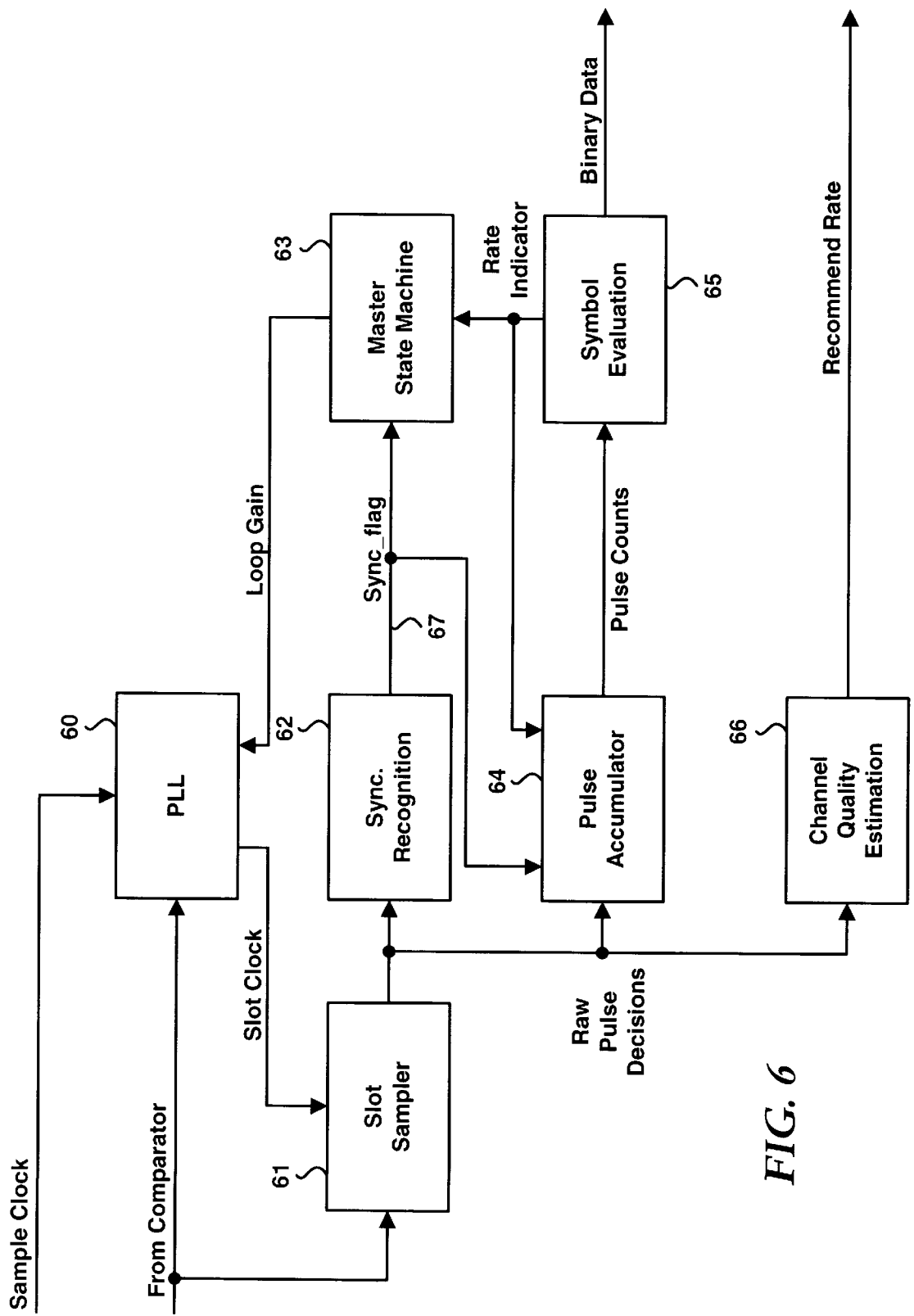
FIG. 6 shows a schematic block diagram of an adaptive data rate (variable rate) system showing in particular the functional blocks for channel quality estimation and frame/symbol synchronization (sync recognition), according to the present invention.
Figure 7:
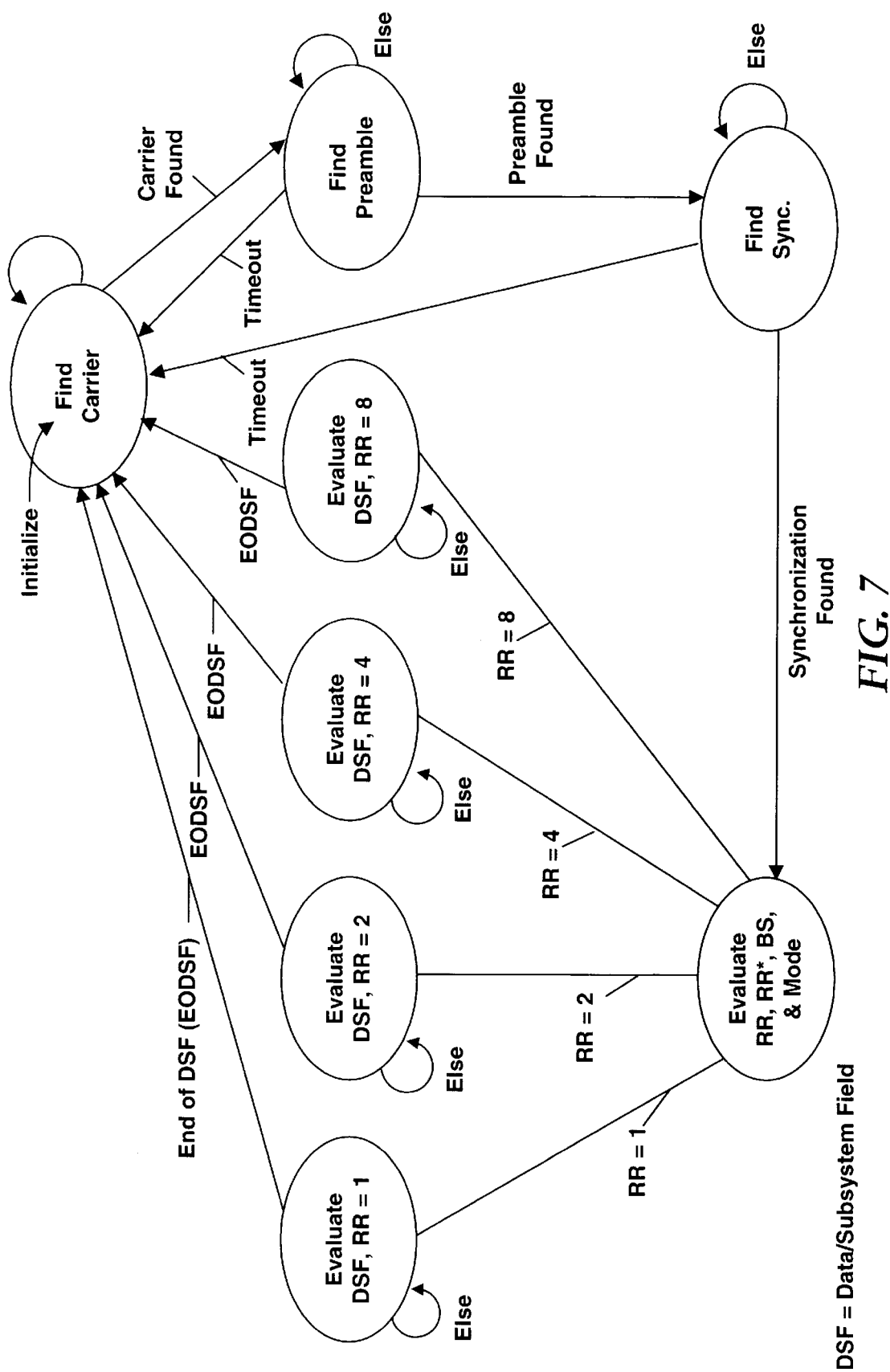
FIG. 7 shows a simplified state transition diagram of the master state machine of FIG. 6 for a system using rate reduction (RR)=1, 2, 4, and 8.

In FIG. 6, details of an embodiment of a receiver's digital processing unit 16 are shown. Upon receiving a preamble frames from the comparator 15, first the slot clock is recovered by means of a first-order, digital phase-locked loop (PLL) 60 with variable loop gain and preprocessing to better cope with the noisy PPM signals. Phase estimates and subsequent phase adjustment are based on n-times (n=8, for example) oversampling by means of a slot sampler 61 of the binary-valued signal delivered by the threshold device 15. The PLL loop gain is controlled by a master state machine 63 (MSM). The operation of the MSM 63 is illustrated in FIG. 7. Preferably, the gain is set high at the beginning of preamble reception to obtain fast phase acquisition and to reduce the probability of a hang-up condition of the PLL 60. To prevent the local clock phase from slipping during tracking of the received signal phase, the loop gain is changed to a lower value after correct detection of carrier and preamble data by the carrier sense circuit, according to the present implementation. The PLL 60 locks on the rising edge of the input signal and the recovered slot clock (e.g. 4 MHz) is adequately delayed to serve as reference for the slot sampler 61. A sampling clock's phase resolution of 45° is sufficient for slot sampling without performance degradation. The remaining parts of the circuits are timed with the recovered slot clock (e.g. 4 MHz). Symbol synchronization is accomplished in two steps. The sequence of events follows the simplified state diagram of the MSM 63 shown in FIG. 7. Following carrier detection, a carrier sensing circuit searches for proper preamble pattern and informs the MSM 63 when a valid pulse sequence of preamble 52 was found. In return, the MSM 63 enables a symbol synchronization circuit inside the sync recognition box 62 by providing a trigger signal aligned with the preamble phase (position of preamble pulse), corresponding to the first slot of the specially coded synchronization word. From here on, the frame synchronization circuit being part of the sync recognition box 62 stores the information found in consecutive 32 symbol frames in a 32-bit shift register inside boxy 62 whose outputs are fed into a correlator (it is to be noted that in the present example we assumed that the syncword has 32 bits). Further details of the sync recognition unit 62 are given in FIG. 11. If the received pulse sequence fed into the shift register is found to be the same as the one already known to the receiver, absolute synchronization is achiever, i.e. the MSM 63 assumes that the beginning of the control field 59 of fixed length just ahead of the PPM-encoded data block has been found. In order to indicate that absolute synchronization has been achieved, a sync-flag is provided at the output line 67 of the box 62.

Figure 11:
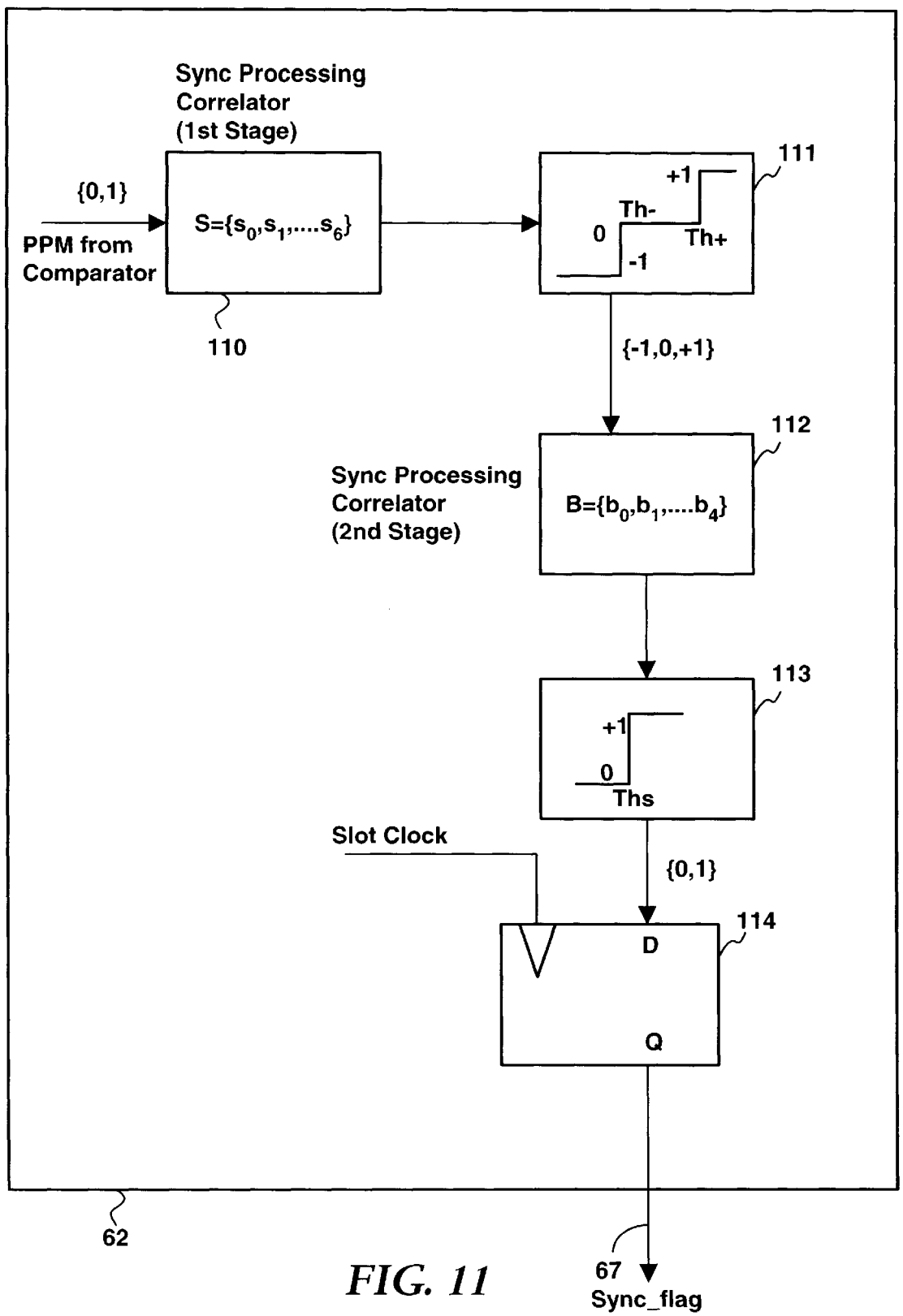
FIG. 11 shows a schematic block diagram of a portion of a receiving station for frame/symbol synchronization (part of 123 in FIG. 12), according to the present invention.

Likewise, one may also employ an algorithm and suited syncword 53 which allows absolute synchronization even if the received syncword is partially corrupted. An example of such a synchronization word is given in FIG. 14, and a suited receiver hardware is illustrated in FIG. 11. E.g., if the correlator 112 result, computed for every symbol frame period where a synchronization pulse can be expected, exceeds a certain threshold Ths (see box 113), the MSM 63 may assume that the beginning of the control field 59 has been found. The syncword 53 as such may also carry additional information, as addressed later.

If the beginning of the control field 59 of fixed length has been found, the beginning of the data/subsystem field 51 is known, too. According to the present example, where the data/subsystem field 51 is PPM-coded, all of the the following symbols are thus interpreted as PPM symbols. Each field 54–57, as shown in FIG. 4B is frame-wise accumulated (e.g. 16 times) in the pulse accumulator 64 and evaluated by a suited symbol evaluation circuit 65. The same procedure may be used for data detection in the data/subsystem field 51 according to the RR information received in the control field 59. There are different ways conceivable how the information carried in the control field 59 can be decoded and transmitted. The receiver has to be designed accordingly.

If the entire data/subsystem field 51 is correctly received, a trigger signal for incrementing the throughput measurement circuit may be generated and the packet success rate counter is reset.

A channel quality estimator 66 supervises the error rate on the IR channel 14. In the present implementation, a digital channel quality estimator 66 is employed because SNR determination by means of analog circuitry or packet success rate measurements are either costly or slow and are thus less well suited. The channel quality estimator 66 supervises the error rate on the IR channel 14. From this estimated error rate the recommended rate reduction factor (RR') for future data/subsystem fields 51 may be determined. For a fast feedback response to the transmitter of the transmitting station, transmission error counting may be done at the PPM symbol level rather than at the data/subsystem field level. Obviously incorrect PPM symbols (i.e., 0, 2, 4, . . . pulses per frame) are counted by observing every received symbol individually. The ratio of observed symbol errors and the total number of symbols received in a data/subsystem field 5 is then taken as a measure of the instantaneous error rate on the IF channel 14.

In the following, examples of a scheme for rate negotiation are given. The maximum possible data rate achieving essentially error-free packet transmission (erroneous packets are repeated on the level of the medium access control protocol) may vary over a wide range within a short time.

Those stations which are able to adapt their data rate need to interchange their currently suitable data rates. To prevent repeated retransmissions, this exchange of rate information may be done within the error feedback message.

Figure 8:
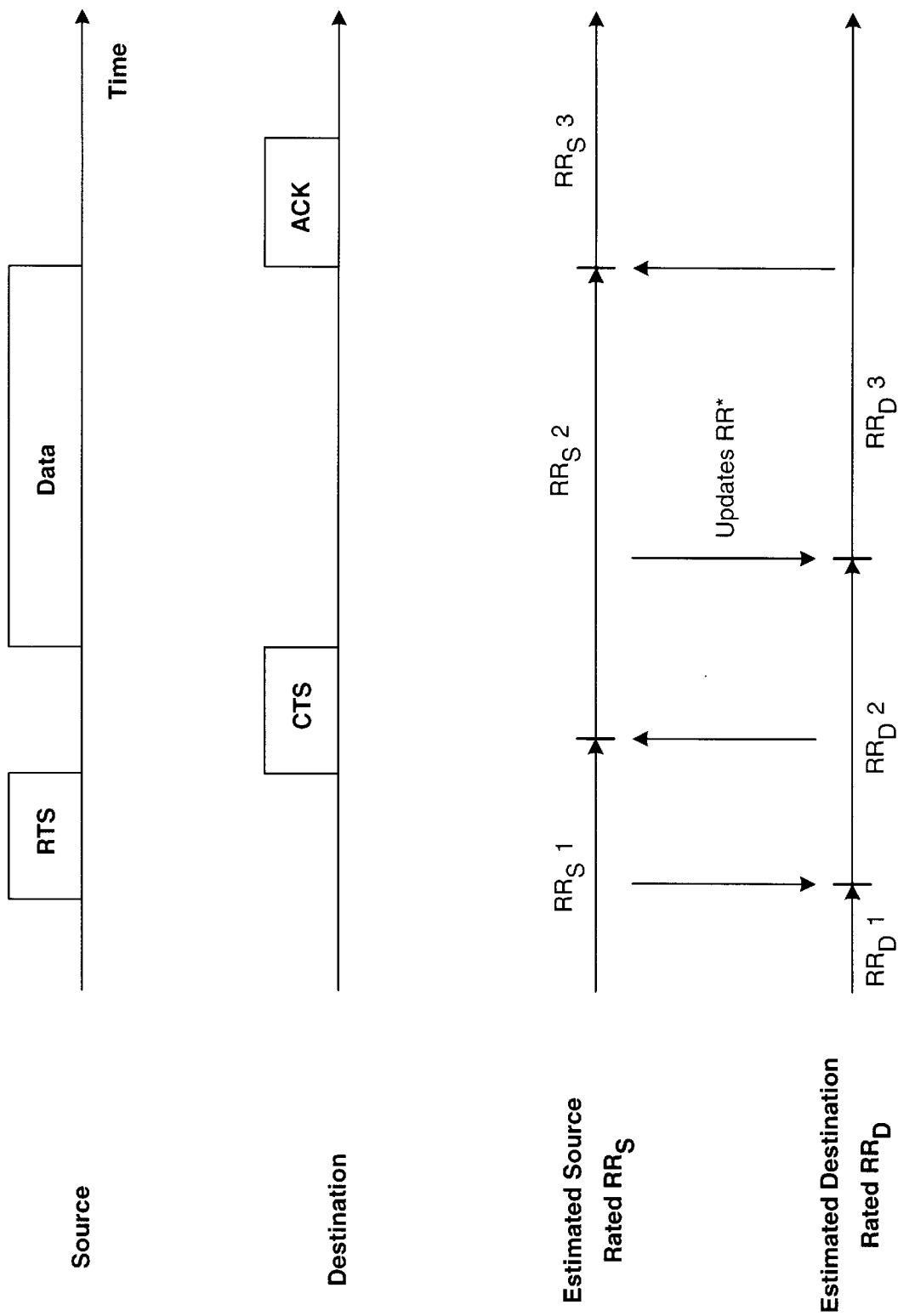
FIG. 8 illustrates a rate negotiation mechanism according to the present invention in conjunction with a standard CSMA/CA (carrier sense multiple access with collision avoidance) protocol.

According to the proposed rate negotiation method, every station transmits the recommended rate reduction (RR*) parameter based on the last received dataframe in the corresponding field of the RPLH. It is illustrated in FIG. 8 how the procedure of rate negotiation may be implemented in a CSMA/CA (carrier sense multiple access/collision avoidance) protocol using Request-To-Send/Clear-To-Send (RTS/CTS). The proposed rate negotiation is based on the following principles:

The channel quality is estimated based on all received data and control frames for which the total number of L-PPM symbols exceeds 128.

The data rate, especially for control frames, is adapted conservatively to prevent unnecessary retransmissions caused by damaged CTS frames or acknowledgement (ACK) frames. Retransmissions are appropriate when collisions occurred and when the channel SNR (signal-to-noise ratio) is high. In cases of low channel SNR, repetition coding (i.e. increasing RR) is more efficient.

A mandatory ACK frame is introduced to transmit the recommended rate reduction symbol and to ensure that only one retransmission of the data block will be necessary.

To alleviate the carrier sense problem, a network allocation method (similar to that in IEEE 802.11) may be used. The reservation information should be transmitted with the highest possible redundancy. For an adaptive rate transmission system we propose that the actual channel reservation time be calculated by means of the rate symbol (RR) and the data block size (BS) transmitted in the control field 59.

The network initialization within a communication cell (see for example FIG. 3) can take place as follows: One station with S1 capability initiates the network start-up by transmitting a special control frame which is defined for every subsystem. This happens first for S1, then the initiating station waits until it got responses from all other S1 stations. The initiating station proceeds in the same manner for S2 and S3. Upon completion, all other stations proceed the same way—each for its respective subsystems— according to the chosen channel access protocol. At the end, all stations transmit their list of asserted connections to every station on their list. By this method each station obtains a status map of every possible connection in the network, including initial channel quality information. These maps are herein referred to as rate/connectivity status maps. Based on this information hidden terminals within the communication cell may be identified. Furthermore, during network initialization one may also transmit information which is important for receiving stations to know. The length of the control field 59, details on the subfields of the control fields 59, and so on can be defined during network initialization.

Figure 9:
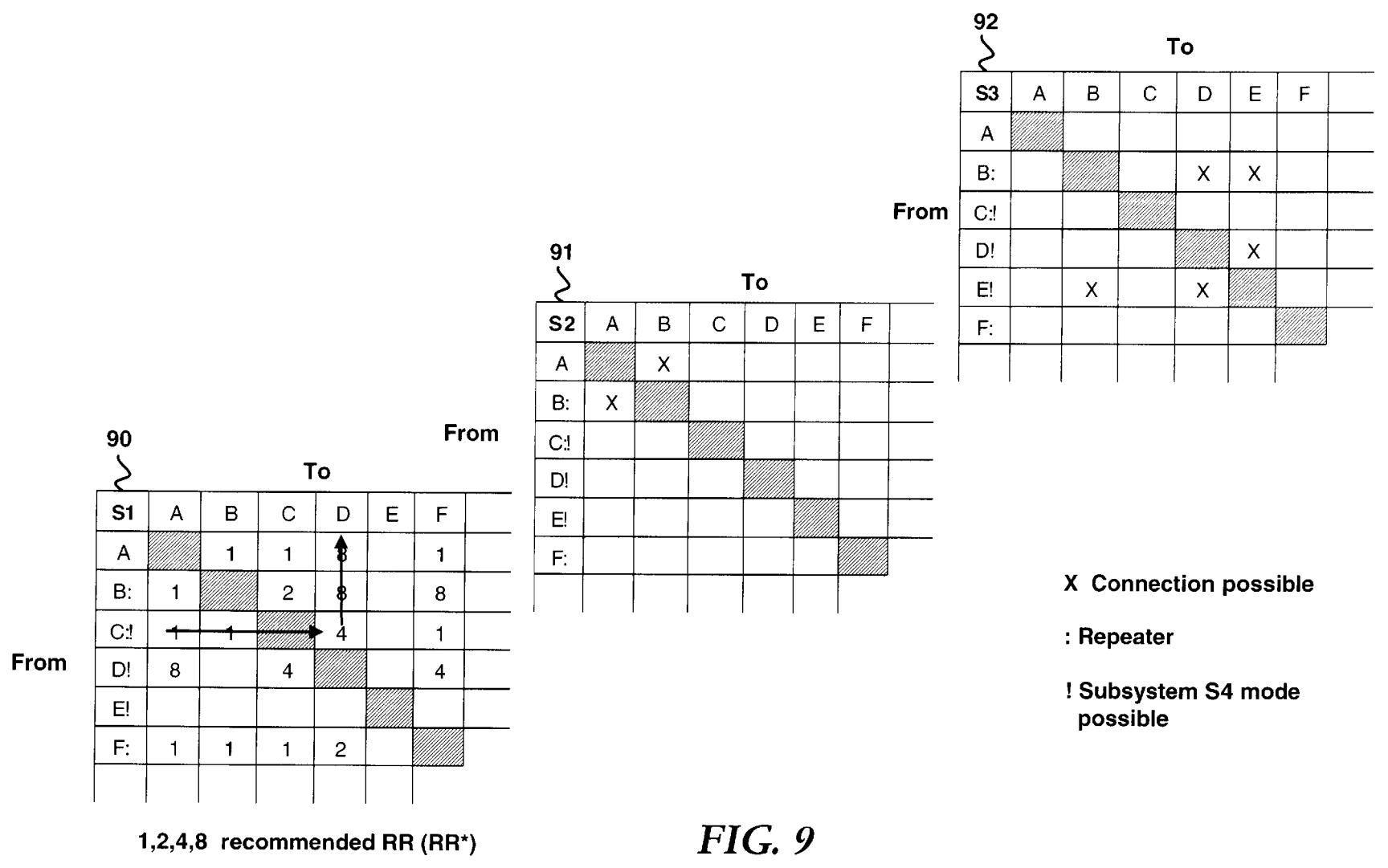

For both user information and network control some kind of rate/connectivity tables (RCT) 90–92 should be sorted in every station and displayed to the user in an effective way. The information of such a rate/connectivity table may also be made available to an application program if needed. The exemplary RCTs 90–92 in FIG. 9 are composed from the rate/connectivity status maps. The RCTs may be used for user information, as illustrated in FIG. 10, network reorganization, and alternative routing through repeaters. Furthermore, an RCT helps increasing network throughput because the initial data rates are known. After some time, the RCTs may need to be refreshed because some S1 station adapted the data rate, stations physically moved, or new stations try to join the network, for example. In the latter case, another initialization procedure must be executed.

The example of displayed user network information for station D shown in FIG. 10 illustrates that station D cannot be received by station B, i.e. station D represents a hidden terminal for station B. In the present example, the display 101 shows a corresponding message recommending rectification of the situation. Furthermore, the example display 100 shows that communication between stations D and A is limited to a relatively low data rate. As shown in the second display 101 of FIG. 10, this implies that a 1.6 MB file transfer would need two minutes to complete. Thus, the recommendation to move closer to station A is displayed to user D.

Excessive header overhead in high-rate systems may be avoided as follows. Stations operating in a subsystem using low-rate transmission (e.g. pager function S4) require a much lower SNR and thus exhibit a much higher robustness against noise (up to 20–30 dB higher) than the chosen SN (SN=S1). Using repetition coding algorithms and a suited symbol synchronization scheme a RPLH can be designed which has high enough robustness for low-rate transmission. However, the required length of such a header would drastically decrease the performance of the SN and other high-rate subsystems. An example of such a header with a synchronization word of increased length used to obtain improved robustness is described in connection with FIG. 14.

Investigations on implementation complexity (cost) and transmission efficiency versus robustness of the system lead to a dual-mode RPLH scheme. A so-called low-rate-reduction-mode RPLH (L-RPLH) supports rate reduction (RR) factors up to eight in SN transmission mode. A more costly high-rate-reduction-mode RPLH (H-RPLH) enables SN communication with a maximum RR of 64. The H-RPLH supports subsystems operating at SNRs up to 20 dB below the SNR required to sustain acceptable packet success probability on a SN link operating without rate reduction (i.e. RR=1). The networks in SN (S1) and high-rate (S2) transmission mode use normally the L-RPLH and they only activate the H-RPLH when low-rate transmission (S3) and/or remote control functions (S4) are announced within the communication cell. With this scheme, and assuming robust direct carrier sensing circuitry is active in the H-RPLH stations, upcoming L-RPLH traffic can be announced to every station within H-RPLH range, even in case where the header itself cannot be correctly decoded. Network initialization and initial channel quality estimation for SN stations are performed in the H-RPLH mode.

To achieve high reliability (robustness), the receiving stations may determine the header mode (L-RPLH or H-RPLH) by analyzing the periodic pattern of the received preamble by means of a pulse averaging procedure (please note that this is not the preamble's primary use according to the present invention). For example, averaging the received preamble stream sixteen times or more times allows for reliable mode detection down to a SNR of 0 dB (where an RR of 64 is required for reliable detection of the data field 51). For example, the preamble pulse sequence 10001000 . . . , having a period of eight slots (length of two 4-PPM symbols), may be used to signal that the header mode is H-RPLH, and the preamble pulse sequence 10000010 . . . , also having a period of eight slots, may signal that the header is L-RPLH. The same circuit used on the receiver side for header mode detection can be also used for robust direct carrier sense detection.

Frame synchronization is required to determine the beginning of the control field 59 and the beginning of the following—possibly repetition coded—data/subsystem field 51. It is also the basis for deduction of the PPM symbol boundaries if PPM-coded transmission is used. For these purposes, a special pulse pattern 53 may be transmitted immediately after the preamble 52 (see FIG. 4A). Common solutions use illegal PPM symbols (e.g. more than one pulse per symbol) to make the synchronization word 53 uniquely detectable or they detect a suitable binary sequence (showing desirable correlation properties) by means of a correlator circuit. However, a single synchronization word 53 working under H-RPLH conditions may have to be excessively long, requiring a correspondingly long correlator circuit. A further problem is that the synchronization word 53 must be embedded within the chosen PPM format to comply with the average power constraints imposed by the IR light source (duty cycle) and to maintain continuity in the received DC-level.

A solution which preserves the duty cycle, avoids DC-level shift, and reduces the required correlator length under H-RPLH conditions will now be described in connection with FIG. 11. Rather than using a long, single synchronization word 53, two relatively short synchronization words may be used to compose a suitable, longer synchronization word. The first one is embedded within the chosen PPM symbol format in such a way that the corresponding first correlator 110 produces ideally, i.e. in the absence of noise, an output corresponding to a second specified synchronization word. The output of this first correlator 110 is then used as the input for a corresponding second correlator 112 who provides the symbol/frame synchronization information after applying a threshold operation 113 to its output. This scheme remarkably reduces the hardware expense for synchronization detection. Furthermore, this scheme is compatible with the dual-mode header transmission method (L-RPLH or H-RPLH).

The two-stage synchronization scheme described below can be extended such that additional information can be conveyed jointly with the synchronization information. For example, the second synchronization word is used in 4 different ways (i.e. for example, (i.e. for example, $B_1 = \{+1, +1, -1, +1, -1\}$,
$B_2 = \{-1, +1, -1, +1, +1\}$,
$B_3 = \{-1, -1, +1, -1, +1\}$,
$B_4 = \{+1, -1, +1, -1, -1\})$ $B_2 = \{-1, +1, -1, +1, +1\}$,
$B_4 = \{+1, -1, +1, -1, -1\})$ such that 2 different second-stage correlators can distinguish the 4 resulting composite synchronization sequences (we assume here that every version of the second synchronization word has a complementary version). The 4 resulting sequences at the output of the first correlator should have good auto-correlation and cross-correlation properties. This scheme can convey 2 bits of information jointly with the synchronization information. Similarly, the scheme can be generalized for example by including the first synchronization word to convey additional bits of information.

In the following, further details on a possible two-stage synchronization scheme and symbol/frame synchronization for low SNR, are given. FIG. 11 illustrates the above mentioned two-stage correlation scheme for frame and symbol synchronization in case of low SNR. In this example, the first correlator 110 is designed to respond to a binary valued first synchronization word. The output of the first correlator 110 is ternary valued (+1, 0, −1) by circuit 111 and provides the input for the second correlator 112. The second correlator's output is again binary valued (0, +1) by circuit 113 and feeds a storage element 114 controlled by the slot clock of the PPM system; the signal Sync_flag at output 67 represents the synchronization information.

Figure 12:
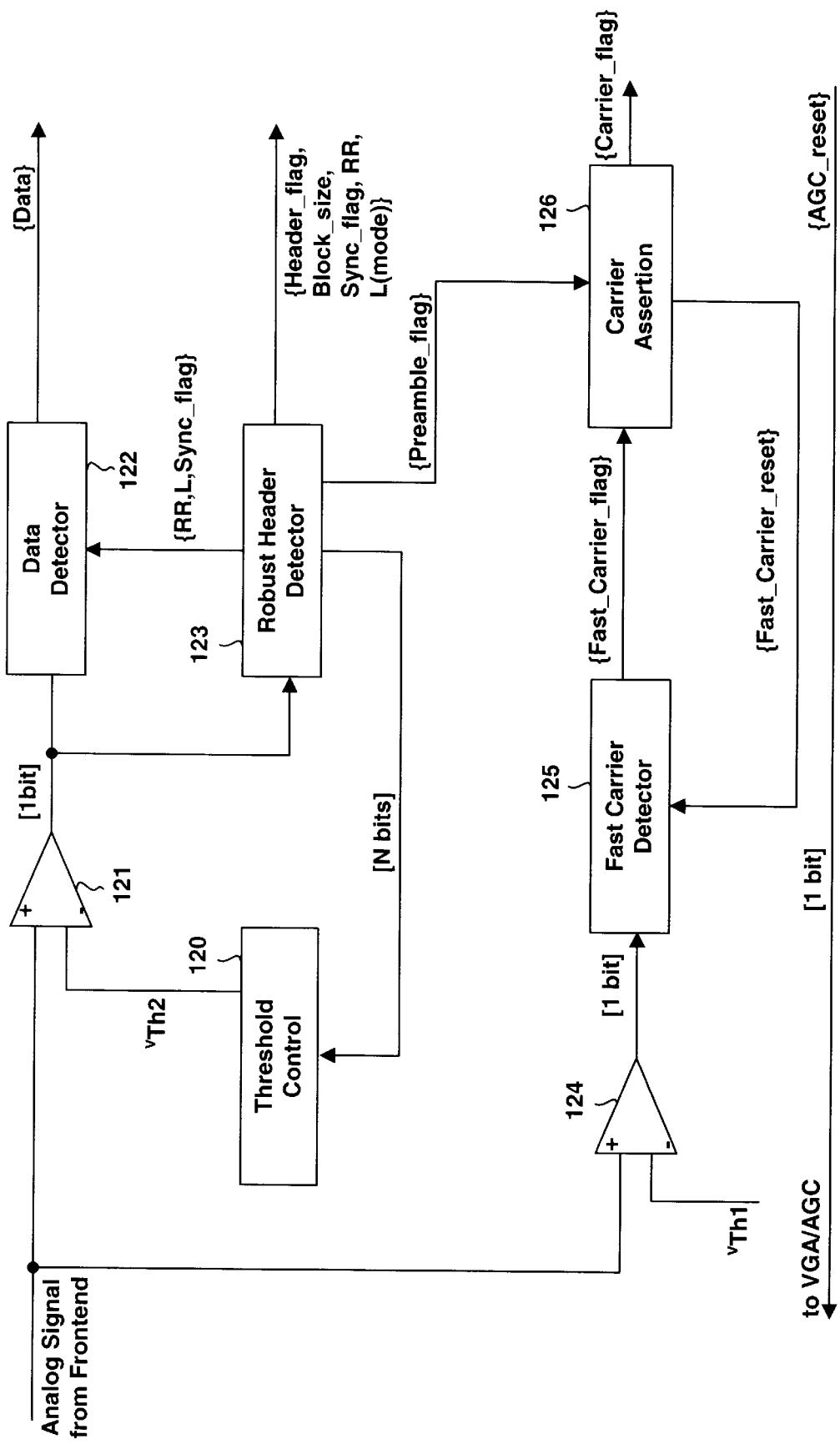
FIG. 12 shows a schematic block diagram of a portion of a receiver, according to the present invention.
Figure 13:
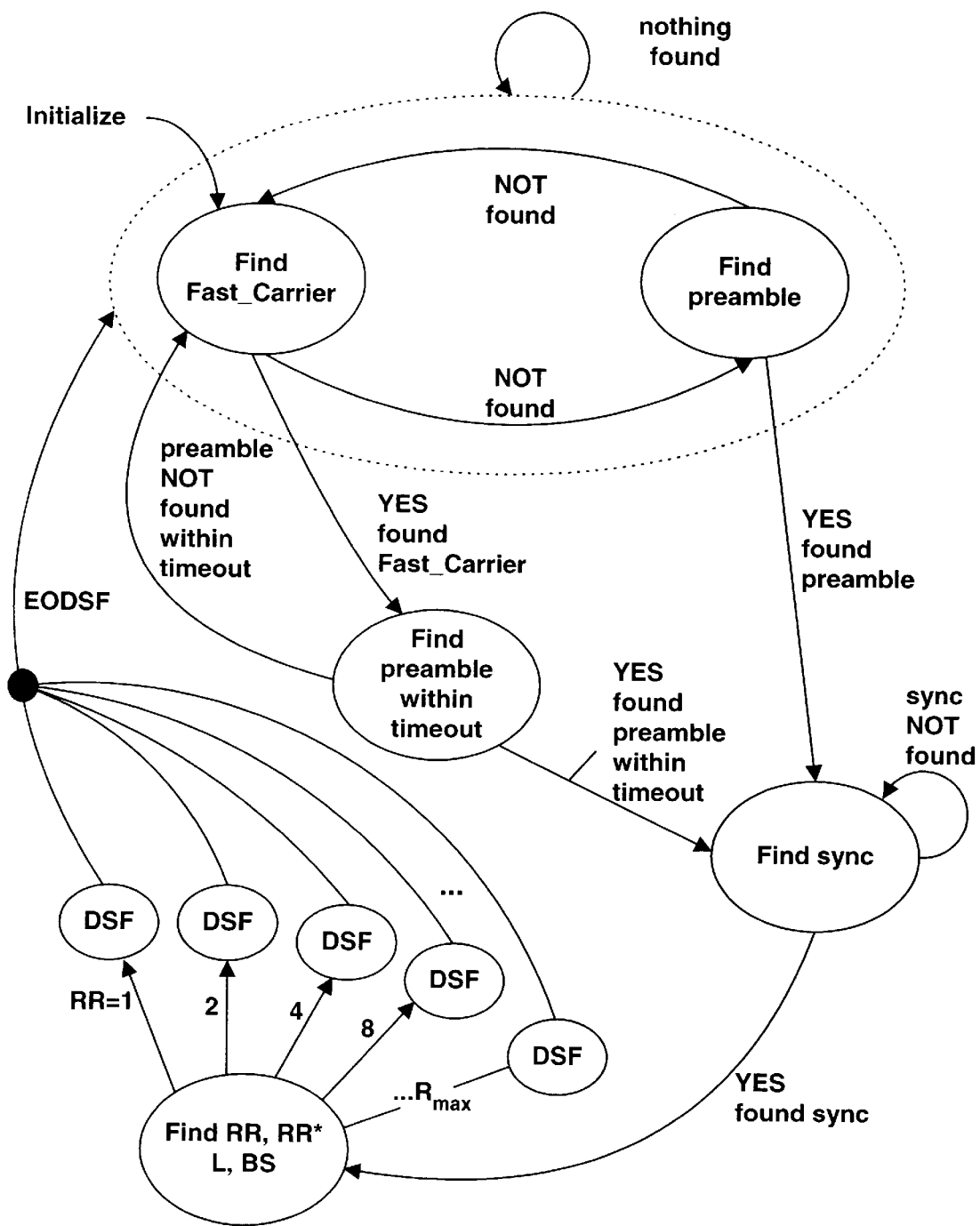
FIG. 13 shows a simplified state transition diagram of a receiver containing the function of FIG. 12 for a system using RR=1, 2, 4, 8, through $RR_{max}$.

Another implementation of a receiver, according to the present invention and a corresponding state diagram are given in FIGS. 12 and 13. This receiver has the desirable property to provide a fast (at medium to high SNR) as well as a robust (at low SNR) carrier detection function. As illustrated in FIG. 12, there are two threshold detectors 121 and 124. The latter one is for fast carrier detection, whereas the first one is for robust header detection 123 as well as data detection 122. The robust header detector 123 provides the signal Preamble_flag to the functional block 126, called carrier assertion, for the purpose of asserting the signal Fast_Carrier_flag provided by the fast carrier detector 125. While the Fast_Carrier_flag signal provides fast carrier detection at medium to good SNRs, the Preamble_flag signal provides a slower signal for carrier detection at low SNR. Combined together, the two signals (Fast_Carrier_flag, Preamble_flag) provide robust as well as fast detection of the carrier. Box 126 generates the signal Carrier_flag (indicating successful carrier detection) from these two signals. In cases where Preamble_flag does not occur within a certain time after Fast_Carrier_flag is raised, a false alarm is declared and Fast_Carrier_flag (and thus the Carrier_flag) is reset by means of the signal Fast_Carrier_reset.

The robust header detector 123 provides the signals Header_flag, Block_size, Sync_flag, RR, L (mode) and probably others—depending on the fields transmitted in the control field 59—to other functions of the receiver not shown.

Since knowledge of RR after reception of the control field 59 within the robust header 50 indicates the channel quality (SNR), this information together with information on the modulation method can be used to adjust the threshold value $V_{TH2}$ of comperator 121 to an optimal value during reception of the data/subsystem field 51. (N bit feedback from 123 to 120). The threshold $V_{TH1}$ of comparator 124 is chosen for optimal fast carrier detection.

In FIG. 14, a synchronization word being composed of two shorter synchronization words (sequence 1 and sequence 2) is illustrated. This Figure illustrates how a PPM transmitter according to the present invention composes such a long synchronization word from the first word (S) and the second word (B). Additionally, it is shown in what order the synchronization word is transmitted within 4-PPM symbol frames. This long synchronization word composed of two shorter ones as well as similar synchronization words are suited for use if the quality of the transmission channel is poor. Thus, this method of symbol/frame synchronization is well suited to enable the design of a robust header in practice. Correct synchronization is possible (through correlation detection) even in the case where only part of the synchronization word is received correctly.

According to the present invention, a user is free to transmit encrypted data within the data/subsystem field 51, however the robust header 50 should never be encrypted so that all stations can understand it when received from any of the participating stations. The inventive concept allows encryption of the information transmitted in the data/subsystem field 51 since there are no restrictions as to what the data/subsystem field has to look like.

It can make sense, however, to include in the control field 59 a sub-field (similar as for the access priority information or mode field) which can be used to indicate to the destination (receiving station) and possibly other stations that the following data/subsystem field will be transmitted in encrypted mode (generally encryption is handled above the physical layer).

More generally, one may specify in the control field 59 a "generic" sub-field of which every station knows that it is there (including position and length), but the meaning of its content only being known to a subset of stations. Inclusion of such a generic sub-field in the control field 59 of the robust header 50 demonstrates that the robust header concept even tolerates some individual degree of freedom without compromising its main intent, namely that it can be understood by all and in particular under very poor channel conditions.

In the following, examples of different implementations of the present invention will be outlined:

1. Hardware according to the present invention may for example be integrated into a computer card which either may be connected to a computer bus by installing it inside the computer's housing, or which may be plugged into a slot (e.g. in form of a Personal Computer Memory Card International Association (PCMCIA) card) provided in said housing.
2. Likewise, the present transmitter/receiver may be provided in a separate housing which is to be connected to a computer.
3. Furthermore, a transmitter/receiver according to the present invention may be integrated into a peripheral device (e.g. a printer). In some cases a lightweight version is sufficient, since usually a peripheral device such as a printer for example is only receiving data. Only a limited amount of information is normally fed back to the station which requested a print job. In such cases it may be sufficient just to transmit the robust physical layer header and some information in the header's control field.

4. The inventive scheme may also be implemented in the form of microcode for execution on a digital signal processor or another special purpose hardware engine.

What is claimed is:

1. A method of enabling wireless optical communication between a transmitting station and a first receiving station capable of receiving data which are modulated using a first modulation method and a second receiving station capable of receiving data which are modulated using a second modulation method, the method comprising:

optically transmitting a preamble comprising frames forming a periodic sequence of pulses with defined period, the number of slots (L) per frame and the frame content being known to said receiving stations, performing carrier detection based on said sequence of pulses received, where
each of said receiving stations determines said period of the sequence of pulses to obtain relative synchronization, and
each of said receiving stations adjusts its clock to the phase of slots of the received sequence of pulses, and clocks said incoming sequence of pulses through a shift register, transmitting a unique synchronization word aligned to said period, said unique synchronization word being known to said receiving stations, correlating said sequence of pulses in said shift register with said unique synchronization word known to it in order to achieve absolute synchronization with said transmitting station upon recognition of said synchronization word, by each receiving station indicating in a control field of predefined length and structure, whether the first or second modulation method will be used for transmission of the data in a data/subsystem field, such that all receiving stations which are able to support the respective modulation method wait for said data.

2. The method of claim 1, whereby a receiving station capable to support different modulation methods further comprising the step of:
switching to the respective modulation method indicated in said control field.

3. The method of claim 1, whereby either said control field, or said data/subsystem field contains a list of addressees for said data.

4. The method of claim 1, whereby pulse-position modulation (PPM) is used as modulation method for the transmission.

5. The method of claim 4, whereby said control field comprises a rate reduction field (RR) which indicates a receiving station how often each pulse-position modulation (PPM) symbol of said data/subsystem field will be repeated.

6. The method of claim 1, whereby said control field comprises a recommended rate reduction field (RR*) for transmission of a recommended rate reduction (RR*) which is employed to negotiate a data rate best suited for communication.

7. The method of claim 6, whereby said recommended rate reduction (RR*) is determined based on pre-defined rules taking into account the actual error rate which occurred during the communication between transmitting station and receiving station.

8. The method of claim 1, whereby said control field comprises a block size field (BS) indicating the number of data units which will be transmitted in said data/subsystem field.

9. The method of claim 1, whereby said control field comprises a mode field which carries the information used to indicate to said receiving station which modulation method will be used.

10. The method of claim 9, whereby said modulation method is either
4-slot pulse-position modulation (4-PPM),
16-slot pulse-position modulation (16-PPM), or
the modulation methods defined in the IrDA standard.

11. The method of claim 1, whereby said control field comprises information signaling to a receiving station whether said data shall be forwarded by said receiving station.

12. The method of claim 1, whereby said control field comprises information which allows any receiving station not being addressed, or not being able to support the modulation scheme indicated in said control field, to determine how long the transmission of said data will take to ensure that these receiving stations remain silent during this transmission.

13. The method of claim 1, further comprising the step of recognizing said synchronization word using an algorithm even in the presence of potential errors caused by corrupted optical communications by each receiving station.

14. The method of claim 1, whereby said synchronization word consists of two synchronizations words such that the recognition at the receiving station can be split into two stages.

15. The method of claim 1, whereby said receiving station and/or transmitting station determine the data rate at which said data are to be transmitted.

16. The method of claim 1, whereby a receiving station determines a recommended data rate to be used for transmission of said data, taking into account the current quality of the communication channel between transmitting station and receiving station, said recommended data rate being determined based on the knowledge when exactly the control field ends and thus said data/subsystem field starts.

17. The method of claim 15 whereby said date rate and/or recommended data rate information is made available to an application program or an end user.

18. The method of claim 1, whereby said control field contains priority information allowing at least two co-existing communication subcells (pico-cells) within a communication cell.

19. The method of claim 1, whereby said control field contains information supporting encryption of said data.

20. A multi-mode packet for wireless optical communication between a transmitting station and a first receiving station capable of receiving data which are modulated using a first modulation method and a second receiving station capable of receiving data which are modulated using a second modulation method, said multi-mode packet comprising:

a pulse-position modulated (PPM) data/subsystem field which carries data to be transmitted, and
a preceding robust physical layer header (RPLH) which can be decoded by all receiving stations, said robust physical layer header (RPLH) having:
a. a preamble with frames forming a periodic sequence of pulses with defined period, the number of slots per frame and the frame contents being known to said receiving stations,
b. a unique synchronization word being known to said receiving stations, and
c. a control field of predefined length and structure comprising mode information indicating which modulation method is used for the transmission of said data, and a rate reduction field (RR) which indicates to said receiving stations how often each pulse-position modulation (PPM) symbol of said data/subsystem field will be repeated.

21. The multi-mode packet of claim 20, whereby either said control field, or said data/subsystem field comprises a list of addressees for said data.

22. The multi-mode packet of claim 20, whereby said control field comprises a recommended rate reduction field (RR*;) for transmission of recommended rate reduction (RR*) information which is employed to negotiate a date rate best suited for communication.

23. The multi-mode packet of claim 20, whereby said control field comprises a block size field (BS) indicating the number of data units which will be transmitted in said data/subsystem field.

24. The multi-mode packet of claim 20, whereby said control field comprises information signaling to a receiving station whether said data shall be forwarded by said receiving station.

25. The multi-mode packet of claim 20, whereby said control field contains information which allows any receiving station not being addressed, or not being able to support the modulation scheme indicated in said control field, to determine how long the transmission of said data will take to ensure that these receiving stations remain silent during this transmission.

26. The multi-mode packet of claim 20, whereby said control field comprises information supporting encryption of said data.

27. A transmitter for wireless optical communication with a first receiving station capable of receiving data which are modulated using a first modulation method and a second receiving station capable of receiving data which are modulated using a second modulation method, said communication being initiated using a robust physical layer header (RPLH) which can be decoded by all receiving stations, said transmitter comprising:
- a header generator providing a preamble, being part of said robust physical layer header (RPLH), with frames forming a periodic sequence of pulses with defined period, the number of slots per frame and the frame content being known to said receiving stations,
- a synchronizer for providing a unique synchronization word, being part of said robust physical layer header (RPLH), and being known to said receiving stations,
- a controller for providing a control field of fixed length and known structure, being part of said robust physical layer header (RPLH), said control field indicating the respective modulation method which will be used for transmission of data,
- a modulator for modulating said data to be transmitted, and
- a data transmitter for transmitting said sequence of pulses in a data/subsystem field, said unique synchronization word being aligned to said sequence of pulses, said control field, and said modulated data.

28. The transmitter of claim 27, further comprising means to provide a list of addressees for said data to be transmitted, said list of addressees being either provided within said control field or said data/subsystem field.

29. The transmitter of claim 27, further comprising means to generate a data field (DSF) using the previously received recommended rate reduction (RR*) for transmission of data, and transmits in said control field its own recommended rate reduction (RR*) being used to negotiate a data rate best suited for communication.

30. The transmitter of claim 27, further comprising means for indicating the number/size of said data to be transmitted.

31. The transmitter of claim 27, further comprising means for signaling to a receiving station whether said data shall be forwarded by said receiving station.

32. A receiver for wireless optical communication in a multi-mode communications cell with a transmitting station which transmits data utilizing one of at least two different modulation methods and which transmits said data with a robust physical layer header (RPLH) which can be decoded by all receivers in the multi-mode communications cell and which RPLH comprises:
- a preamble with frames forming a periodic sequence of pulses with defined period, the number of slots per frame and the frame content being known to said receiver,
- a unique synchronization word known to said receiver, and
- a control field of fixed length and known structure, indicating the respective modulation method which will be used for transmission of data, said receiver comprising:
- means for determining said period of the sequence of pulses, based on the number of slots per frame and the frame content being known to it, in order to obtain relative synchronization,
- means for carrier detection based on said sequence of pulses,
- means for adjusting said receiver's clock to the phase of the slots of said sequence of pulses received,
- means for clocking said sequence of pulses received through a shift register the length of which is defined by said unique synchronization word,
- means for correlating said sequence of pulses in said shift register with said unique synchronization word known to it in order to achieve absolute synchronization with said transmitting station upon recognition of said unique synchronization word,
- means to determine from said control field whether said receiver is able to support the respective modulation method which will be used for the transmission of said data,
- means which determine from the information received whether the receiver is the right recipient for said data, and
- means enabling the receiver to receive said data right after the end of said control field.

33. The receiver of claim 32, further comprising means to switch between one, two or more modulation methods.

34. The receiver of claim 32, wherein said means to achieve absolute synchronization comprise a first and a second correlator such that a synchronization word generated using two synchronization words can be recognized in two stages.

35. The receiver of claim 32, further comprising means to determine a recommended rate reduction (RR*), derived from channel quality estimation, being used to negotiate a data rate which is best suited for the transmission of said data.

36. The receiver of claim 32, further comprising means for determining the number/size of said data to be expected, analyzing information transmitted in said control field.

37. The receiver of claim 32, further comprising means for retransmission of said data if the received information indicates that retransmission is required.

38. A multi-mode wireless optical communication system comprising: at least one transmitter comprising:
- a header generator providing a preamble, being part of a robust physical layer header (RPLH), with frames forming a periodic sequence of pulses with defined period, the number of slots per frame and the frame content being known to a receiving station,
- a synchronizer for providing a unique synchronization word, being part of said robust physical layer header (RPLH), and being known to said receiving station,
- a controller for providing a control field of fixed length and known structure, being part of said robust physical layer header (RPLH), said control field indicating the respective modulation method which will be used for transmission of data,
- a modulator for modulating said data to be transmitted, and
- a data transmitter for transmitting said sequence of pulses in a data/subsystem field, said unique synchronization word being aligned to said sequence of pulses, said control field, and said modulated data, and at least one receiver comprising:
  - means for determining said period of the sequence of pulses, based on the number of slots per frame and the frame content being known to it, in order to obtain relative synchronization,
  - means for carrier detection based on said sequence of pulses,
  - means for adjusting said receiver's clock to the phase of the slots of said sequence of pulses received,
  - means for clocking said sequence of pulses received through a shift register the length of which is defined by said unique synchronization word,
  - means for correlating said sequence of pulses in said shift register with said unique synchronization word known to it in order to achieve absolute synchronization with said transmitter upon recognition of said unique synchronization word,
  - means to determine from said control field whether said receiver is able to support the respective modulation method which will be used for the transmission of said data,
  - means which determine from the information received whether the receiver is the right recipient for said data, and
  - means enabling the receiver to receive said data right after the end of said control field.

39. The communications system of claim 38 wherein the at least one transmitter further comprises a list generator for providing a list of addresses to which said data is to be transmitted, said list being provided either within said control field or said data/subsystem field.

40. The communications system of claim 38 wherein:

the at least one transmitter further comprising means to generate a data field using the previously received recommended rate reduction for transmission of data, and transmits in said control field its own recommended rate reduction being used to negotiate a data rate best suited for communication; and the at least one receiver further comprising means to determine a recommended rate reduction, derived from channel quality estimation, being used to negotiate a data rate which is best suited for the transmission of said data.

41. The communications system of claim 38 wherein:

the at least one transmitter further comprising means for indicating the number/size of said data to be transmitted; and the at least one receiver further comprising means for determining the number/size of said data to be expected by analyzing information transmitted in said control field.

42. The communications system of claim 38 wherein:

the at least one transmitter further comprising means for signaling to said at least one receiver whether said data should be forwarded by said at least one receiver; and the at least one receiver further comprising means for retransmission of said data if the received information indicates that retransmission is required.

* * * * *